United States Patent [19]

Demny

[11] Patent Number: 4,991,597
[45] Date of Patent: Feb. 12, 1991

[54] PROCESS AND APPARATUS FOR WRAPPING CIGARETTE PACKS IN TRANSPARENT FILM

[75] Inventor: Helmut Demny, Gevelsberg, Fed. Rep. of Germany

[73] Assignee: Maschinenfabrik Alfred Schmermund GmbH & Co., Gevelsberg, Fed. Rep. of Germany

[21] Appl. No.: 57,430

[22] Filed: Jun. 2, 1987

[30] Foreign Application Priority Data

Jun. 4, 1986 [DE] Fed. Rep. of Germany ....... 3618736

[51] Int. Cl.⁵ ................................................ A24C 1/00
[52] U.S. Cl. .................................... 131/280; 131/105
[58] Field of Search .......................... 131/280, 105, 281

[56] References Cited

FOREIGN PATENT DOCUMENTS

0067332 5/1982 European Pat. Off. .
771842 4/1937 United Kingdom .

*Primary Examiner*—V. Millin
*Attorney, Agent, or Firm*—Chilton, Alix & Van Kirk

[57] ABSTRACT

A process and apparatus for wrapping cigarette packages in transparent film, in which the transparent film is expanded as a result of heating before being wound around the cigarette package and bonded to itself. A tear-open strip is mated with and subsequently bonded to the film during the heating thereof.

15 Claims, 3 Drawing Sheets

PROCESS AND APPARATUS FOR WRAPPING CIGARETTE PACKS IN TRANSPARENT FILM

BACKGROUND OF THE INVENTION

The present invention relates to a packaging process and to an apparatus for use in such process. More specifically, this invention is directed to wrapping cigarette packages in transparent film.

Equipment for wrapping cigarette packages in transparent film are known; see, for example, published German applications Nos. 3,515,655 and 2,608,934. When cigarette packages are wrapped in transparent film, this technique generally being known as "cellophaning", the transparent film has to be laid round the cigarette pack as tautly as possible and then folded and welded, in order to obtain a good appearance. However, the transparent film can only be tautened to a certain extent and, particularly at high working speeds desirable for the packaging of cigarettes, it is impossible to tauten the transparent film correctly. Thus, an increase in the working speed results in an unsatisfactory appearance of the finished cigarette packages wrapped in transparent film.

SUMMARY OF THE INVENTION

The object of the invention is, therefore, to provide a process and an apparatus which make it possible to ensure perfect wrapping of articles, cigarette packages for example, at high processing speeds.

This object is achieved by means of heating the wrapping, i.e., the transparent film, to cause its expansion before the wrapping is wound around the cigarette package or other article being packaged.

After the transparent film has been passed completely around the cigarette package and folded and welded, the wrapped film cools and shrinks and thus is thereby evenly tightened around the cigarette package. No change of the molecular structure of the wrapping material occurs during practice of the invention, but only a thermal expansion.

BRIEF DESCRIPTION OF THE DRAWINGS

The invention is explained in detail below with reference to the exemplary embodiments illustrated in the accompanying drawings, in which.

DESCRIPTION OF THE PREFERRED EMBODIMENTS

Figure 1:
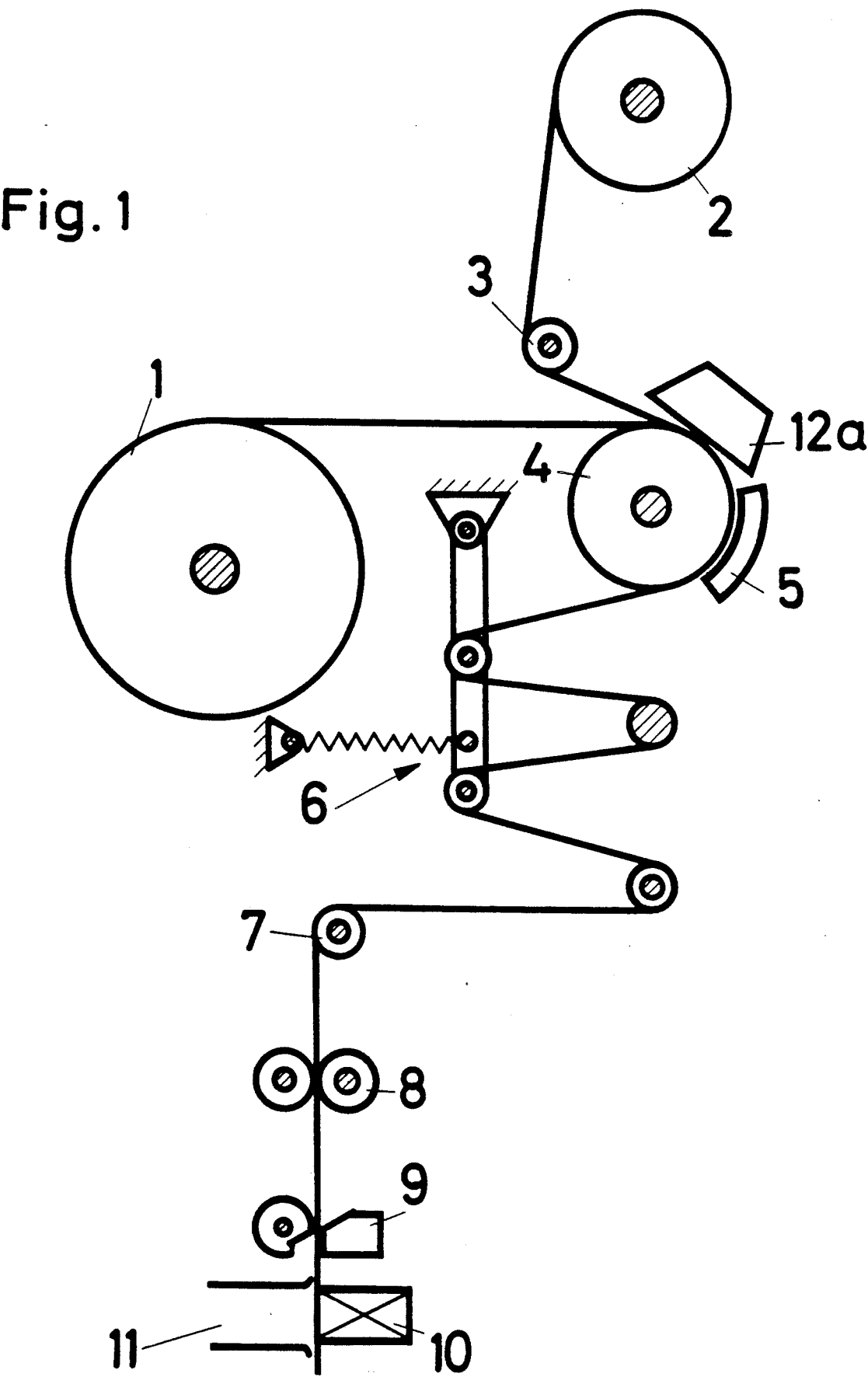
FIG. 1 is a diagrammatical illustration of a feed device of an apparatus for wrapping cigarette packages, in accordance with the first embodiment of the invention wherein the heating device is an infra-red heater located adjacent the drum where the transparent film sheet and tear open strip sheets are joined.

The following description refers to a number of parts or structures common to several embodiments of the invention. It should be understood that common parts or structures that have the same function are identified herein by the same reference numeral.

In all the Figures, a transparent film sheet is located on a reel 1, and reel 2 contains a tear-open strip sheet. The transparent film sheet is delivered to a drum 4, to which the tear-open strip sheet is also fed at the same time via a roller 3, in such a way that the tear-open strip sheet is laid onto the transparent film sheet. The two sheets are joined to one another by means of a heating element 5, the heating element 5 being arranged adjacent to the periphery of the drum 4 in a region in which the tear-open strip sheet runs past in engagement with the transparent film sheet. The tear strip typically has a width of one or two millimeters and the length of heater 5 in the direction parallel to the axis of drum 4, is of commensurate width.

The sheet of packaging material formed in this way is kept taut by means of a spring-prestressed pendulum 6 and is fed via rollers 7 to a pair of rollers 8 which are driven intermittently. The continuous sheet of packaging material is delivered from rollers 8 to a knife station 9, where "leafs" of predetermined length are cut off the sheet of packaging material. The severed leaf is located between a cigarette pack 10 and a "mouthpiece" 11, and the cigarette package 10 pushes the cut-off leaf through the mouthpiece 11, thereby forming the first U-shaped wrapping. This wrapping is subsequently folded further round the cigarette pack 10 and welded, these operations being carried out in the known way, as described, for example, in the publications mentioned above.

In the embodiment of FIG. 1, an infra-red emitter 12a is arranged, for example, adjacent to the drum 4 and serves to heat the transparent film sheet and the tear-open strip sheet on the drum 4. The heater 12a extends along the full axial length of drum 4, to provide a uniform heating across the sheets. The sheets are expanded as a result of this heating, the pendulum 6 ensuring that the expanded sheet of packaging material is kept taut. Consequently, the expanded sheet of packaging material passes between the cigarette package 10 and the mouthpiece 11 and is folded around the cigarette package while in the expanded state. The subsequent cooling of the thus formed wrapping ensures that the wrapping tightly and evenly conforms to the cigarette package.

The infra-red emitter 12a is controlled as a function of processing, i.e. machine speed and thus in accordance with the advancing speed of the transparent film in the feed device, so that uniform heating of the sheets to approximately 50° to 70° C., especially approximately 60° C., is carried out. The thermal expansion of the film preferably is within the range of 0.2 to 0.5%. This temperature increase is less than that typically produced by the heating element 5 used for adhesively joining the tear open strip to the transparent film. A substantial cooling down during the wrapping of the cigarette pack 10 does not occur because of the high packing rate of the system. For example, at a packing rate of 500 packages per minute, only 0.12 second is needed to wrap one package.

Figure 2:
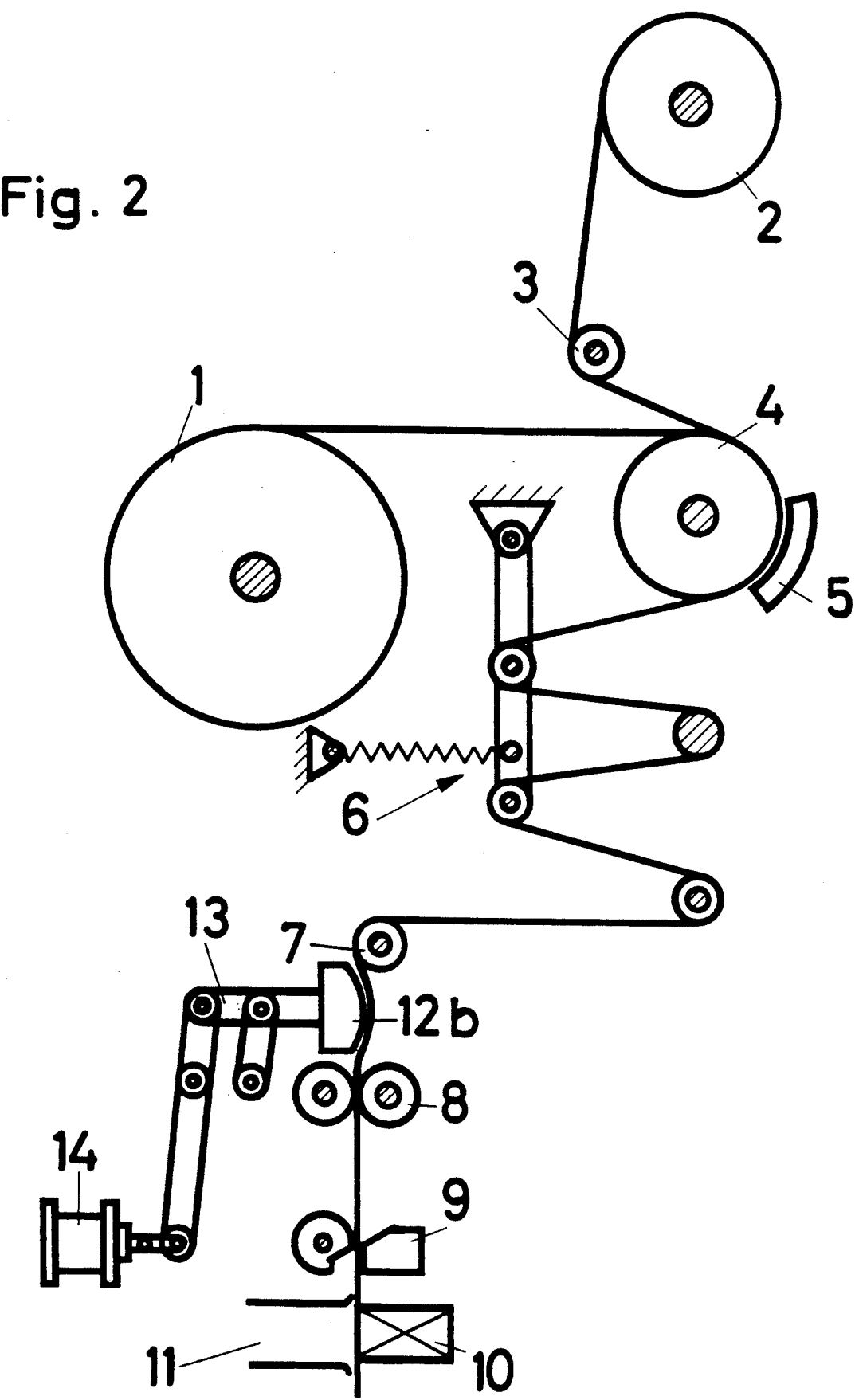
FIG. 2 is similar to FIG. 1, but illustrates a second embodiment wherein the heating device is in contact with the film sheet immediately upstream of the station where the film is folded round the cigarette packages.

According to FIG. 2, a heating element 12b is provided in contact with the film between the last roller 7 and the pair of rollers 8. An air gap can selectively be established between the heating element 12b and the film, by means of levers 13 and a pneumatic or magnetic cylinder 14, so that the sheet of packaging material is not burnt or damaged when the machine stops. Here again, the film is kept taut by means of the pendulum 6.

Figure 3:
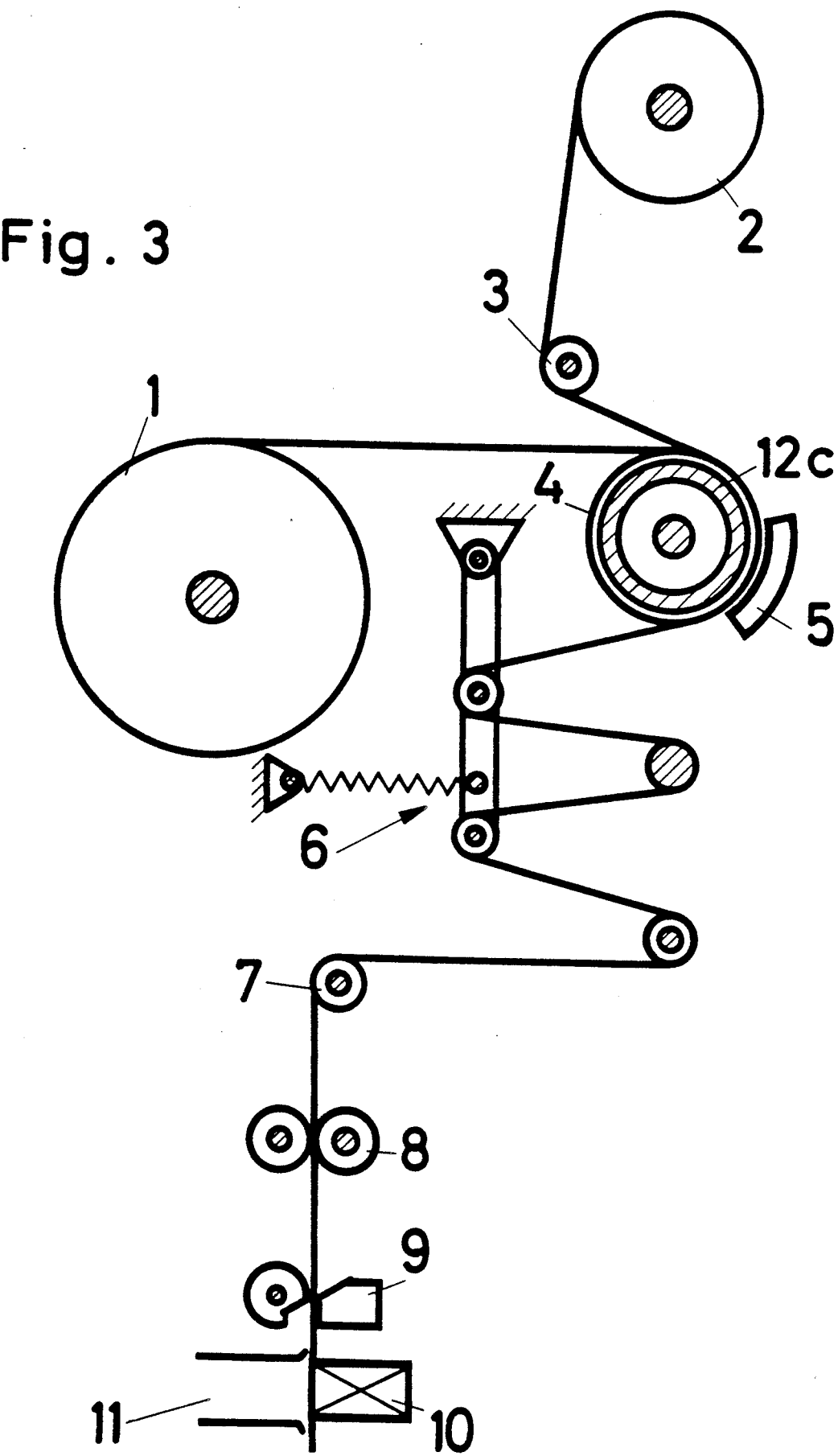
FIG. 3 is similar to FIG. 1, but illustrating a third embodiment wherein the heating device is contained within the drum.

According to FIG. 3, the drum 4 has an internal heating element 12c, so that the transparent film sheet and the tear-open strip sheet are appropriately heated and consequently expanded via the heated drum 4. The heating element 5 would normally also be provided, although it may in some cases be possible to use an adhesive which is activated at low tempertures and thus the heater 5 could be omitted.

While preferred embodiments have been shown and described, for purposes of illustration, the foregoing description should not be deemed a limitation of the invention herein. Accordingly, various modifications, adaptations and alternatives may occur to one skilled in the art without departing from the spirit and scope of the present invention.

I claim:

1. A method for wrapping a package in a transparent film which undergoes thermally induced expansion, the film subsequently shrinking upon cooling, said method comprising the steps of:
   drawing the film taut;
   heating the film to cause the film to uniformly thermally expand;
   folding the expanded film around a package and bonding the film to itself to define a wrapping; and
   allowing the folded and bonded film to cool whereby the film shrinks and the wrapping tightly conforms to the package.

2. The method of claim 1, wherein the package is a cigarette package.

3. The method of claim 2 wherein the step of heating the film comprises increasing the temperature of the film to the range of about 50° C. to 70° C.

4. The method of claim 3, wherein the temperature of the film is raised to about 60° C.

5. The method of claim 2 further including the step of joining a tear-open strip to the film and wherein the step of heating the film simultaneously effects the bonding of the tear-open strip to the film.

6. The method of claim 5 wherein the step of heating is carried out by passing the joined film and tear-open strip over at least a portion of the surface of a heated drum.

7. The method of claim 6 wherein the step of heating the film comprises increasing the temperature of the film to the range of about 50° C. to 70° C.

8. Apparatus for wrapping cigarette packages in transparent film comprising:
   wrapping means for folding a piece of film around a cigarette package and bonding the folded film to itself to define a transparent wrapper;
   feeding means for supplying film which undergoes thermally induced expansion and subsequent shrinkage if permitted to cool to the wrapping means;
   tension means cooperating with the feeding means for keeping the film taut as the film is supplied to the wrapping means; and
   heating means for thermally expanding the film uniformly prior to the film being supplied to the wrapping means, said heating means acting on the film while the film is kept taut by said tension means.

9. The apparatus of claim 8 further including means for regulating the heating means in response to the speed at which the film is supplied by the feeder means.

10. The apparatus of claim 9 wherein the heating means includes an infra-red emitter.

11. The apparatus of claim 8 wherein the heating means includes a heating element in contact with the film, and means for selectively moving the heating element out of contact with the film when the feeding means is stopped.

12. The apparatus of claim 11 wherein the means for selectively moving the heating element includes levers connected to the heating element and an actuating cylinder for controlling the levers.

13. The apparatus of claim 8 wherein the feeding means includes a drum, and the heater means includes a heater inside the drum.

14. The apparatus of claim 13 further including means for supplying a tear-open strip sheet to said drum.

15. The apparatus of claim 14 wherein the film and tear-open strip sheet are bonded together on the drum by an adhesive at the time the film is thermally expanded.

* * * * *